United States Patent [19]

Karr, Jr. et al.

[11] 4,128,473
[45] Dec. 5, 1978

[54] CATALYTIC HYDROTREATING PROCESS

[75] Inventors: Clarence Karr, Jr.; Kenneth B. McCaskill, both of Morgantown, W. Va.

[73] Assignee: The United States of America as represented by the United States Department of Energy, Washington, D.C.

[21] Appl. No.: 857,718

[22] Filed: Dec. 5, 1977

[51] Int. Cl.$^2$ .............. C07C 5/10; C10G 23/04; B01J 35/10
[52] U.S. Cl. .................. 208/108; 48/DIG. 5; 208/112; 208/215; 252/477 R; 260/666 PY; 260/667; 260/668 R; 422/212; 422/222; 423/648 R
[58] Field of Search ............ 208/108, 10, 56, 112; 260/666 PY, 667, 668 F; 23/288 R; 44/DIG. 5; 423/648 R

[56] References Cited

U.S. PATENT DOCUMENTS

| | | | |
|---|---|---|---|
| 3,210,162 | 10/1965 | Rudd | 23/285 |
| 3,562,346 | 2/1971 | Smirnov et al. | 260/673.5 |
| 3,779,711 | 12/1973 | Gryaznov et al. | 23/288 R |
| 3,782,904 | 1/1974 | Fletcher | 48/DIG. 5 |
| 4,014,657 | 3/1977 | Gryaznov et al. | 23/288 R |
| 4,026,958 | 5/1977 | Gryaznov et al. | 260/668 D |
| 4,041,093 | 8/1977 | Smirnov et al. | 260/673.5 |

*Primary Examiner*—Delbert E. Gantz
*Assistant Examiner*—G. E. Schmitkons
*Attorney, Agent, or Firm*—Dean E. Carlson; Stephen D. Hamel; Earl L. Larcher

[57] ABSTRACT

Carbonaceous liquids boiling above about 300° C such as tars, petroleum residuals, shale oils and coal-derived liquids are catalytically hydrotreated by introducing the carbonaceous liquid into a reaction zone at a temperature in the range of 300° to 450° C and a pressure in the range of 300 to 4000 psig for effecting contact between the carbonaceous liquid and a catalytic transition metal sulfide in the reaction zone as a layer on a hydrogen permeable transition metal substrate and then introducing hydrogen into the reaction zone by diffusing the hydrogen through the substrate to effect the hydrogenation of the carbonaceous liquid in the presence of the catalytic sulfide layer.

9 Claims, No Drawings

CATALYTIC HYDROTREATING PROCESS

BACKGROUND OF THE INVENTION

This invention was made in the course of, or under, a contract with the United States Energy Research and Development Administration. The present invention relates generally to the catalytic hydrogenation (hydrotreating) of carbonaceous materials, particularly carbonaceous liquids having boiling points above about 300° C.

A variety of chemical processes involve the hydrogenation of heavy high-boiling carbonaceous material to provide a lower boiling product. This catalytic hydrogenation is also called hydrotreating which can be achieved in either the liquid or the vapor phase. The present invention relates to an improved method for catalytic hydrogenation which is particularly applicable to the liquid phase catalytic hydrogenation of carbonaceous liquids derived from coal, oil shale, tar sands, etc., which contain sulfur in the form of either pyritic sulfur or organic sulfur or both. The subject method is applicable to the hydrogenation of sulfur-containing coal which has been dissolved or extracted in a solvent such as benzene or hydrogen donor solvents such as tetralin and may also be used for hydrotreating such liquids containing undissolved coal particles or mineral matter.

PRIOR ART

The chemistry of the hydrogenation of carbonaceous materials is well known. For example, the chemistry of hydrotreating coal and tar is described in "Chemistry of Coal Utilization", supplemental Volume, by H. H. Lowry, John Wiley and Sons, Inc., 1963, pp. 1048-1964, which is incorporated herein by reference. A comprehensive collection of U.S. Patents relating to the hydrogenation of coal derived liquids is set forth in "Oil from Coal", Francis W. Richardson, Noyes Data Corporation, Parkridge, New Jersey, 1975, pp. 126-335.

In general, catalytic hydrogenation processes utilized for the conversion of coal derived liquids to lower boiling liquids have been of limited success unless mineral matter or undissolved coal is removed from the liquids prior to catalytic treatment. Another difficulty encountered in the catalytic hydrogenation of coal derived liquids is due to the deposit of coking precursors on the catalyst which tend to poison and inactivate the catalytic surface. Previous catalytic hydrotreating processes of coal derived liquids normally include a catalyst recycle step in which the catalytic material is periodically or continuously removed from the reaction zone and subjected to chemical regeneration. This recycling process is costly and invariably results in the loss of catalytic material and a reduction in the catalytic activity of the recycled catalytic material. Still another problem encountered in previous processes for hydrogenating carbonaceous liquids is the inefficient utilization of hydrogen. For example, a substantial portion of incoming hydrogen frequently escapes unused from the reactor with the overhead and must then be separated cryogenically from $C_1 - C_4$ hydrocarbons and recompressed for futher use. Consequently, a process for catalytically hydrogenating carbonaceous liquids which increases the efficiency of hydrogen utilization and which does not require previous solids separation, catalyst recycle or regeneration has long been needed.

SUMMARY OF THE INVENTION

Accordingly, it is an object of the present invention to provide an improved method for catalytically hydrotreating carbonaceous liquid wherein sulfur removal, solid separation, and catalyst recycle, or catalyst regeneration procedures are not required, and wherein up to 100% of the hydrogen entering the reactor is utilized in a single pass.

A further object of the present invention is to provide an improved catalytic hydrotreating method useful for hydrogenating slurries of coal in coal derived liquids or solutions thereof.

These and other objects for hydrotreating a carbonaceous liquid are achieved by practicing the steps comprising:

a. In a reaction zone at a temperature in the range of 300° to 450° C. and at a pressure in the range of 300 to 4000 psig introducing the carbonaceous liquid for contact with a catalytic transition metal sulfide layer on a hydrogen permeable substrate comprising a transition metal selected from the group of Fe, Ni, Co, Mo, W, V, Ca, Mn, Cu, Zn, Cd and combinations thereof.

b. Introducing hydrogen or a reactive hydrogen-containing species into said reaction zone by creating a hydrogen pressure on the substrate external to said reaction zone with said hydrogen pressure being sufficient to effect diffusion of the hydrogen or the reactive hydrogen-containing species through said metal substrate to cause the hydrogenation of said carbonaceous liquid in the presence of the catalytic sulfide layer.

Apparatus suitable for practicing this invention comprises a hydrotreating reactor in which a plurality of hydrogen permeable transition metal tubes are disposed within a housing defining a reactor in spaced apart relationship with each of said tubes having the inner surface thereof provided with a catalytic layer or coating of transition metal sulfide. Suitable conduit means are provided for conducting the carbonaceous liquid feed into the reaction zone through the interior of said tubes to contact said sulfide layer. Conduit means are also provided for conducting hydrogen gas into the housing volume encompassing said tubes under sufficient pressure to effect diffusion of the hydrogen gas through said permeable tubes and through said sulfide for hydrogenating the carbonaceous liquid. Further conduit means are provided for recovering hydrotreated products from the tubes.

DETAILED DESCRIPTION

According to this invention, carbonaceous liquid is catalytically hydrogenated by contacting the carbonaceous liquid in a reaction zone with a catalytic metal sulfide present as a layer on a surface of a hydrogen permeable transition metal substrate. Hydrogen is introduced into the reaction zone by applying the hydrogen to the side of the substrate opposite the catalytic sulfide layer with the hydrogen being at a pressure sufficient to cause the hydrogen or reactive hydrogen containing species, e.g. transition metal hydride, to diffuse through the substrate to effect the hydrogenation of the carbonaceous liquid within the reaction zone in the presence of catalytic sulfide surface. The temperature within the reaction zone is in the range of 300° to 450° C., preferably 375° to 425° C. Below 300° C. the hydrogenation reaction rates are too slow, and the hydrogen permeability of nickel and other transition metals in non-porous form is negligible. Above 450° C. carbonization of coal-derived feeds to char becomes significant. The pressure in the reaction zone is maintained in a range of 300 to 4000 psig, preferably between 500 to 2000 psig. Below 300 psig hydrogen reaction rates are too slow. Above about 2000 psig the economics of compression and reaction equipment become increasingly unfavorable.

The carbonaceous liquid which is hydrotreated according to this invention can be any unsaturated hydrocarbon material, preferably those having boiling points above about 250° C. Example of such carbonaceous liquids include: petroleum residuals, boiling above about 390° C., carbonaceous liquids derived from oil shale; tar sands, or coal and solutions of these organic liquids in various solvents such as benzene, or tetralin. The transition metal can be any of the transition metals which form catalytic sulfides for the hydrogenation of carbonaceous materials. Such transition metals include Fe, Co, Mo, Ni, W, V, Cr, Mn, Cu, Zn, and Cd, or combinations thereof. The sulfide layer on the transition metal substrate is easily formed initially by contacting substrate with $H_2S$ at 400° C. and a partial pressure of 7 psig. During operation of the hydrotreating reaction the metal sulfide surface is continually maintained by the action of sulfur containing compounds in the carbonaceous liquid in which there is at least 0.2 weight percent sulfur in sulfur compounds as are customary in the case of coal derived liquids and liquids derived from tar sands. If necessary, sufficient quantities of sulfur bearing compounds such as $CS_2$ could be added to the carbonaceous liquid to provide the required sulfidization of the transition metal.

It has been found according to this invention that sulfiding a transition metal surface does not substantially decrease its hydrogen permeability and results in a catalytic sulfide having a much greater surface area than the hydrogen permeable transition metal itself. The hydrogen permeable substrate can be, for example, in the form of a thin walled tube or a porous metal substrate prepared by well known powder metallurgical compacting and sintering techniques. To satisfactorily practice the present invention the porous tube or substrate may possess a porosity in the range of an effective amount near zero which will provide for hydrogen passage and the formation and retention of the sulfide layer up to 20 percent. The mean pore size in the tube or substrate may be in the range of about 0.05 microns down to an effective size near zero which will allow for the diffusion of the hydrogen and the formation of the sulfide layer.

The hydrogen pressure to be applied to the surface of the transition metal substrate disposed on the outside of the reaction zone need only be sufficient to cause diffusion of hydrogen through the substrate to effect the hydrogenation reaction in the presence of the catalyst. This pressure should be sufficient to maintain a pressure differential in the range of about 1 to about 1700 psig across the substrate. The hydrogen may diffuse to or at least partially through the catalytic sulfide layer as molecular hydrogen, dissociated atomic hydrogen, or as reactive hydrogen containing species, such as nickel hydride. Of course, the desired hydrogen pressure for effecting the diffusion will depend upon the permeability and thickness of the metallic substrate. During the hydrogenation reaction no catalytic activity is lost and hydrogen can be utilized quantitatively to effectively elminate the need for costly hydrogen separation, recycle, and recompression steps.

The following Examples illustrate the catalytic hydrogenation of this method as applied to carbonaceous materials designed to simulate or model synthetic crude prepared from the liquefaction of coal. These Examples were carried out in a tube and shell reactor. The shell consisted of a Schedule 80 stainless steel pipe 3 inches in outer diameter by 4 feet 7 inches in length. One end of the pipe was adapted to accept tubing from ⅜ inch to 1 inch in diameter and the other end was modified to accept tubing from ¼ inch to ⅜ inch in diameter. A nickel tube to be provided with a catalytic nickel sulfide layer on the inner walls thereof was connected at each end to short lengths of stainless steel tubing and inserted into the reactor shell. The reactor containing the nickel tube was suspended vertically in a high temperature furnace. Dimensions of the nickel tube were 17 and ⅝ inch in length by ⅜ inch outer diameter with the wall thickness of the tube reduced by machining from the original 0.035 inch to 0.017 inch up to a point approximately 1 inch from each end. The thin wall nickel tubing was nickel-200 composed of 99.5 weight percent nickel with small amounts of iron and manganese present as impurities.

Permeability measurements were made on the nickel tubes by determining the rate of change of hydrogen differential pressure from the shell side to the permeable nickel tubing side in a closed system prior to the run. The internal surfaces of all the nickel tubes were provided with inner nickel-sulfide layer by passage of 50% hydrogen sulfide and 50% hydrogen mixture through the tube for 4 hours at a tube temperature of 400° C. The sulfided tubes were cooled to 100° C. and purged with nitrogen to remove all traces of hydrogen sulfide. Alternatively, the sulfide layer may be provided by using a sulfur compound such as $CS_2$ in the liquid carbonaceous feed. Hydrogenation of liquid feed was accomplished by pumping the feed at a predetermined rate up through the sulfided tube to react with hydrogen diffusing from the shell through the tube wall. The identities of the metal sulfides formed on the interior of the catalyst tubes were determined by x-ray diffraction analysis while the compositions of the liquid feed and liquid products, and the composition of the gaseous products, were determined by gas chromatography/mass spectrometry and gas chromatography.

X-ray diffraction analyses of the various samples of sulfided nickel tubing showed that in each instance the catalytic sulfide coating or layer on the inner wall consisted of a mixture of $Ni_3S_4$ and $Ni_3S_2$. $Ni_3S_2$ is likely the only form present soon after the start of each hydrogenation run since all nickel sulfides are reported to rapidly convert to the subsulfide by hydrogen in any use of the sulfides for hydrogenation reaction. The use of nickel subsulfide as a catalyst for hydrongenation is described in "Sulphide Catalysts, Their Properties and Applications", by Weisser and Landa, Pergamon Press, New York, 1973.

Also tested were samples of finely porous nickel-molybdenum and cobalt-molybdenum tubing fabricated from micron sized powders by plasma spraying the powdered mixture onto a mandrel followed by high-temperature sintering to densitites in excess of 95% of the theoretical density. The dimensions after sintering are 16.5 inches in length, 0.181 inch ID, and 0.396 inch OD. The total length was 21 inches after braising on nickel tips for ease of mounting in the reactor. These tubes were provided with the sulfide layer in the same manner as the nickel tubes described above.

Tables I and II set forth below depict the reaction conditions and results for five runs in which Reilly tar oil was hydrogenated in the sulfided nickel tubing. The catalytic function of the $Ni_3S_2$ coating is demonstrated by the decreases in the amounts of six major components of the feed and the increases in the amounts of eleven probable product compounds. In Table II, two compounds namely, phenanthrene and benzothiophene present in the liquid feed in the largest amounts showed the greatest changes in concentration, from 81 to 83 millimoles of benzothiophene per 90 millimoles reacted (except in run 4 where no benzothiophene was present) and 43 to 55 mmole phenanthrene per 91 mole reacted (except in run 4 where no benzothiophene was present and 65 mmole phenanthrene was reacted). Other major feed components which underwent reaction are also shown in Table II.

The thin-walled nickel catalyst tube in run 2 was regenerated with air oxidation after being used in run 1 and then resulfided. This tube showed the greatest activity of the five tubes used. The lowest activity was shown for the tube in run 1, even lower than the tubes used in runs 4 and 5 which were not presulfided with the $H_2$-$H_2S$ mixture. In runs 4 and 5 a more effective nickel subsulfide coating was obtained by the reaction of the organic sulfur compounds present in the tar oil (0.64 wt.% sulfur) and by the reaction of the benzothiophene added to the tar oil feed. It can be seen by comparing runs 4 and 5 that the small amount of sulfur in the tar oil was as effective as was the larger amount of benzothiophene added. The tubes from all runs did not have any noticeable carbon deposits, even after 13 hours operation. The very small amounts of hydrocarbon gases detected in the gas in the tubing indicated that only very limited cracking of the feed occurred. Typical concentrations of these gases were 0.14 volume percent methane and 0.03 volume percent ethane with the remainder being hydrogen required to maintain the 1000 psig tube side pressure.

TABLE 1

Operating Conditions for Thin-Wall Nickel Tubing Hydrogen Permeable Catalyst Reactors

| Hydrogenation Run No. | 1 | 2 | 3 | 4 | 5 |
|---|---|---|---|---|---|
| $H_2$ Permeability of Cat. Tube- 700 psig Diff. & 400° C, cc/min | 0.77 | 0.72 | 0.68 | 1.83 | 1.83 |
| Dry Air Oxidation of Catalyst Surface | Non Oxidized | Oxidized 4 Hrs. at 400° C | Non Oxidized | Non Oxidized | Non Oxidized |
| Sulfiding Conditions - Internal Surface of Tube | 50% $H_2$ + 50% $H_2S$ 4 Hrs. at 400° C | 50% $H_2$ + 50% $H_2S$ 4 Hrs. at 400° C | 50% $H_2$ + 50% $H_2S$ 4 Hrs. at 400° C | Non Sulfided Sulfided by Feed Oil | Non Sulfided at Start of Run |
| $H_2$ Permeability of Cat. Tube- 700 psig, 400° C after sulfiding, cc/min | 0.79 | 0.93 | 0.57 | 1.83 | 1.83 |
| Feed Raw Material | Clean Reilly Tar Oil + Benzothiophene | Clean Reilly Tar Oil + Benzothiophene | Clean Reilly Tar Oil + Benzothiophene | Clean Reilly Tar Oil | Benzothiophene Modified Reilly Tar Oil |
| Wt. of Feed Material, g | 151.80 | 131.89 | 146.76 | 142.00 | 187 |
| Pump Rate, cc/hr | 7.04 | 10.65 | 8.90 | 15.33 | 11.49 |
| Catalyst Tube Temperature ° C | 400 | 400 | 400 | 400 | 400 |
| Pressure Differential (shell to tube) psig - $H_2$ | 700 | 700 | 700 | 700 | 700 |
| Tube Side Pressure, psig | 1,000 | 1,000 | 1,000 | 1,000 | 1,000 |
| Residence Time in Catalyst Tube, Hrs. | 2.87 | 1.90 | 2.27 | 1.32 | 1.62 |
| LHSV | 0.35 | 0.53 | 0.44 | 0.76 | 0.62 |
| Total Run Time, Hrs. | 12.27 | 9.0 | 12.0 | 9.33 | 13.08 |

TABLE II

Amounts of Reactant and Product Compounds in Feed Oil and Product from Ni Hydrogen Permeable Catalyst Tube; 400° C; 1,000 psig Tube Side Millimoles/100 GRAMS

| COMPOUND | m/e | Feed Oil + Benzothiophene | Run 1 Prod. 0.35[4] | Change[2] | Run 2 Prod. 0.53[4] | Change | Run 3 Prod. 0.44[4] | Change | Run[3] 4 Prod. 0.76[4] | Change | Run 5 Prod. 0.62[4] | Change |
|---|---|---|---|---|---|---|---|---|---|---|---|---|
| Naphthalene (R)[1] | 128 | 46.8 | 37.5 | −9.1 | 34.06 | −12.74 | 35.00 | −11.8 | 34.37 | −18.47 | 32.19 | −14.61 |
| 1-Benzothiophene (R) | 134 | 90.3 | 8.95 | −81.3 | 8.13 | −82.17 | 8.20 | −82.10 | 0.0 | 0.0 | 7.68 | −82.62 |
| Benzene (P) | 78 | 0.0 | 0.26 | +0.26 | 3.46 | +3.46 | 0.89 | +0.89 | 1.41 | +1.41 | 1.79 | +1.79 |
| Toluene (P) | 92 | 0.54 | 2.06 | +1.52 | 13.47 | +12.93 | 3.04 | +2.50 | 5.65 | +5.11 | 7.17 | +6.63 |
| Xylenes & Ethylbenzene (P) | 106 | 0.0 | 2.17 | +2.17 | 2.73 | +2.73 | 3.11 | +3.11 | 2.83 | +2.83 | 2.45 | +2.45 |
| Trimethylbenzenes (P) | 120 | 0.08 | 2.75 | +2.67 | 1.83 | +1.75 | 1.91 | +1.83 | 1.83 | +1.74 | 1.58 | +1.50 |
| 2-Methylnaphthalene (R) | 142 | 37.6 | 25.5 | −12.1 | 24.64 | −12.96 | 22.11 | −15.49 | 21.05 | −21.34 | 22.60 | −15.00 |
| Ethylindan (P) | 146 | 0.0 | 2.39 | +2.39 | 2.19 | +2.19 | 2.53 | +2.53 | 2.67 | +2.67 | 2.26 | +2.26 |
| Indan (P) | 118 | 2.54 | 3.60 | +1.06 | 4.41 | +1.87 | 3.05 | +0.51 | 3.64 | +0.77 | 3.64 | +1.10 |
| Acenaphthene (R) | 154 | 49.0 | 33.11 | −15.9 | 30.84 | −18.16 | 27.53 | −21.47 | 29.09 | −26.28 | 29.67 | −19.33 |
| Ethylnaphthalenes (P) | 156 | 4.67 | 9.20 | +4.53 | 10.77 | +6.1 | 10.12 | +5.45 | 9.23 | +3.96 | 10.00 | +5.33 |
| Dimethylnaphthalenes (P) | 156 | 17.1 | 22.8 | +5.70 | 25.32 | +8.22 | 26.79 | +9.69 | 25.00 | +5.68 | 23.78 | +6.68 |
| Fluorene (R) | 166 | 36.9 | 28.2 | −8.70 | 26.44 | −10.46 | 24.39 | −12.51 | 24.75 | −16.94 | 25.96 | −10.94 |
| Phenanthrene (R) | 178 | 90.7 | 47.8 | −42.9 | 41.23 | −49.47 | 35.88 | −54.82 | 37.75 | −64.74 | 40.56 | +50.14 |
| Methylbiphenyls (P) | 168 | 3.33 | 13.1 | +9.77 | 17.79 | +14.46 | 17.62 | +14.29 | 14.46 | +10.7 | 16.72 | +13.39 |

TABLE II-continued

Amounts of Reactant and Product Compounds in Feed Oil and Product from Ni Hydrogen Permeable Catalyst Tube; 400° C; 1,000 psig Tube Side Millimoles/100 GRAMS

| COMPOUND | m/e | Feed Oil + Benzothio- phene | Run 1 Prod. 0.35[4] | Change[2] | Run 2 Prod. 0.53[4] | Change | Run 3 Prod. 0.44[4] | Change | Run[3] 4 Prod. 0.76[4] | Change | Run 5 Prod. 0.62[4] | Change |
|---|---|---|---|---|---|---|---|---|---|---|---|---|
| Biphenyl (P) | 154 | 8.31 | 12.3 | +3.99 | 13.31 | +5.0 | 13.11 | +4.8 | 12.46 | +3.07 | 12.59 | +4.28 |

[1]R = Reactant, P = Product
[2]+ = Increase, Feed to Product; - = Decrease, Feed to Product
[3]1-Benzothiophene Free Reilly Tar Oil Feed Used in Run 4
[4]LHSV (Liquid Hourly Space Velocity)

Table III below shows hydrogen permeability measurements made on empty sulfided tubing, i.e., without reactants present, to determine what effect the reactants would have on the hydrogen diffusion rate. It was observed that the diffusion rates measured were substantially lower than those required for the amounts of reactants disappearing, or the amounts of products appearing. Apparently, the permeability of the tubing increases under reaction conditions, as compared to the static pressure test conditions, with virtually all the diffused hydrogen being consumed. The amount of unreacted hydrogen was negligible, as indicated by a wet test meter connected to the reactor outlet.

TABLE III

Hydrogen Available, Based on Diffusion into Empty Hydrogen Permeable Catalyst Ni Tube

| Run No. | Total Feed, g | Total Hydrogen Flow Sulfided Catalyst, cc | Residence Time In Catalyst Tube Hours | Millimoles $H_2$ per 100g Feed[1] |
|---|---|---|---|---|
| 1 | 151.80 | 581.59 | 2.87 | 15.15 |
| 2 | 131.89 | 502.20 | 1.90 | 15.16 |
| 3 | 146.76 | 410.40 | 2.27 | 10.90 |
| 4 | 142.00 | 1024.40 | 1.32 | 29.42 |
| 5 | 187.00 | 1436.20 | 1.62 | 31.00 |

[1]Hydrogen corrected to STP from 69° F. (20.55° C) and 29.4 inches barometric pressure.

Runs 6 through 11 as shown in Table IV demonstrate the hydrogenation of four pure polycyclic aromatic compounds. Benzothiophene was added to the feeds in order to insure maintenance of the sulfided surface. During runs 6 through 11 the hydrogen diffusion through the catalytic tubes was measured from the shell side to the inner side of the tube over a shell to tubing pressure differential in the range of 300–1700 psig and at temperatures of 400° and 450° C. At both temperatures the amount of hydrogen diffusing through the tubing at a differential pressure of 300 psig was essentially zero. The hydrogen flow through the wall increased rapidly with increasing differential pressure, leveling off at about 0.45 liters per hour at 400° C. and 1500 psig differential pressure, in the static pressure test made prior to the runs. In the results depicted in the Table, LHSV represents liquid hourly spaced velocity. As shown, the percent conversion of the various compounds increased with increasing temperature. The pressure differential for the runs was 700 or 750 psig with the inner tube pressure being about 1000 psig. Generally the feed residence time in the tube was about 1 hour. There was generally a stoichiometrically deficient amount of hydrogen available and it can be presumed that the major portions of hydrogen were consumed at the catalyst surface before hydrogen bubbles are formed in the liquid feed.

TABLE IV

Reaction of Diffused Hydrogen with Pure Compounds in Thin Wall Ni Tubing with $Ni_3S_2$ Coating, about 1,000 PSIG Solvent = Phenylcyclohexane

| Run No. | Temp., °C | LHSV | Compound | Feed | Weight % Product | Hydro- generated |
|---|---|---|---|---|---|---|
| 6 | 290 | 1.0 | Benzothiophene | 5.74 | 4.68 | 19 |
| 7 | 290 | 1.0 | Phenanthrene | 7.58 | 6.36 | 16 |
|   |   |   | Benzothiophene | 6.22 | 5.11 | 18 |
| 8 | 290 | 1.0 | Acenaphthene | 7.67 | 4.98 | 35 |
|   |   |   | Benzothiophene | 6.25 | 5.63 | 10 |
| 9 | 340 | 1.0 | Fluorene | 7.79 | 5.13 | 21 |
|   |   |   | Benzothiophene | 6.09 | 5.30 | 13 |
| 10 | 400 | 1.2 | Phenanthrene | 12.97 | 7.70 | 41 |
|   |   |   | Benzothiophene | 7.06 | 4.79 | 32 |
| 11 | 450 | 0.51 | Phenanthrene | 5.21 | 2.62 | 50 |
|   |   |   | Benzothiophene | 5.10 | 2.23 | 56 |

Runs 12 through 16 demonstrate the use of porous nickel molybdenum tubing as a catalytic reactor. Table V contains the experimental parameters for these runs. Runs 12, 13 and 14 were performed on mixtures of phenylcyclohexane, phenanthrene and benzothiophene and runs 15 and 16 were performed on filtered Reilly tar oil. Tables VI and VIII present the analytical data for runs 12 through 16. It can be seen in Table V that with a low hydrogen pressure (650 psig) inside the tubing, and about 4.5 psig differential for diffusing the hydrogen through the pores of the tubing from the shell side, there was substantial reaction of phenanthrene (45% conversion), and benzothiophene (27% conversion). With the higher hydrogen pressure in run 13 enough of the intermediate di- and tetrahydrophenanthrenes were produced to be detected and the amount of biphenyl increased. With the longer residence time in run 14 the amounts of the intermediates dropped, but the amounts of biphenyl and alkylbenzenes increased. The apparent increase in the amounts of phenanthrene and benzothiophene in run 13 was due to the loss of volatiles, mostly benzene, from the product. Based upon the yields of toluene, xylenes, and biphenyl it can be seen that the amount of conversion is approximately doubled upon doubling the pressure within the interior of the porous tubes.

In Table VII are the analytical results of the receiver products of run 15 and 16 with Reilly coal tar creosote oil feeds. In run 15 considerable total hydrogen sulfide evolved, showing that the 0.6 wt.% sulfur in the feed was insufficient to maintain a heavy sulfide coating inside the nickel-molybdenum tubing. This condition was probably due to the fact that the hydrogen permeability of the nickel-molybdenum tubing was relatively high when compared with the nickel tubing used in runs 1 through 11. The evolution of considerable hydrogen sulfide from a run with a low-sulfur feed (Reilly tar oil), compared to a relatively low evolution from a high-sulfur feed (containing benzothiophene), indicates that the metal sulfide coating supplied part of this hydrogen sulfide, and the coating was thereby partly depleted. Nevertheless, significant conversion of various feed components was observed. The major reactants were acenapthene, phenanthrenes, pyrene and fluoranthene while the major products were tetrahydroacenaphthene, benzenes, etc. The total amount of these reactants converted at 400° C. and 767 psig was 4.51 wt.% and the total yield of product was 4.24 wt.%. When the pressure was approximately doubled to 1380 psig as in run 16 the total decrease in reactants was roughly doubled to 10.50 wt.% and the total increase in products was also doubled to 10.47 wt.%. In these runs these were not the only tar oil components converted. For example, the concentration of chrysene went from 1.22 to 0.98 wt.% in run 15 and from 1.25 to 0.60 wt.% in run 16 and there were other identified products so that the close correspondence of the decreases of reactants and the increases of products as shown in Table VII is partially coincidental.

TABLE VI

Reaction of Pure Compounds at 400° C with Hydrogen Diffusing Through Porous Nickel-Molybdenum Tubing with a Sulfided Inner Wall Feed: 4.52 wt. % benzothiophene
10.17 wt. % phenanthrene
(solvent: phenylcyclohexane)

| | Receiver Product, Wt. % | | |
|---|---|---|---|
| Run No. | 12 | 13 | 14 |
| Pressure, psig | 650 | 1350 | 1350 |
| LHSV | 20.0 | 20.0 | 13.3 |
| Benzene | 16.56 | 0.69 | 14.10 |
| Toluene | 0.63 | 1.49 | 9.00 |
| Xylenes | 1.77 | 3.33 | 12.68 |
| Trimethylbenzenes | 0.06 | 0.97 | 3.49 |
| Biphenyl | 0.58 | 1.28 | 7.98 |
| Dihydrophenanthrene | 0.00 | 2.26 | 0.64 |
| Tetrahydrophenanthrene | 0.00 | 1.09 | 0.00 |
| Phenanthrene | 5.60 | 12.03[1] | 8.39[1,2] |
| Benzothiophene | 3.29 | 7.97[1] | 4.37[1,2] |

[1]High, due to loss of volatiles, mostly benzene.
[2]Feed: 3.80 wt.% benzothiophene; 11.15 wt.% phenanthrene.

TABLE VII

Reaction of Coal Tar Creosote Oil at 400° C with Hydrogen Diffusing Through Porous Nickel-Molybdenum Tubing with Sulfided Inner Wall

| | Composition, Weight % | | | | | |
|---|---|---|---|---|---|---|
| Run No. | | 15 | | | 16 | |
| LHSV | | 5.9 | | | 4.8 | |
| Pressure, psig | | 1,380 | | | 767 | |
| Reactants | Feed | Receiver Product | Decrease | Feed | Receiver Product | Decrease |
| Acenaphthene | 8.61 | 8.45 | 0.16 | 8.23 | 4.03 | 4.20 |
| Phenanthrenes[1] | 20.01 | 19.06 | 0.95 | 20.77 | 18.44 | 2.33 |
| Pyrene | 6.68 | 4.30 | 2.38 | 5.59 | 3.52 | 2.07 |
| Fluoranthrene | 5.83 | 4.81 | 1.02 | 5.99 | 4.09 | 1.90 |
| Total | | | 4.51 | | | 10.50 |
| Products | | Increase | | | Increase | |
| Benzene | 0.00 | 0.21 | 0.21 | 0.00 | 1.52 | 1.52 |
| Toluene | 0.10 | 0.10 | 0.00 | 0.33 | 2.22 | 1.89 |
| Xylenes | 0.16 | 0.20 | 0.04 | 0.21 | 2.03 | 1.82 |
| Indan | 1.23 | 1.57 | 0.34 | 1.99 | 3.06 | 1.07 |
| Tetralin | 1.15 | 1.60 | 0.45 | 1.45 | 2.15 | 0.70 |
| Methylnaphthalenes | 11.70 | 14.56 | 2.86 | 9.29 | 10.91 | 1.62 |
| Tetrahydroacenaphthene | 0.00 | 0.34 | 0.34 | 0.00 | 1.85 | 1.85 |
| Total | | | 4.24 | | | 10.47 |

[1]Phenanthrene plus methylphenanthrenes.

Table VIII depicts the reaction conditions, and compositions of reactants and products, for runs 17, 18 and 19 using the porous cobalt-molybdenum tubing. By comparing the results for the nickel-molybdenum reac-

TABLE V

Operating Conditions for Porous Nickel-Molybdenum Tubing Hydrogen Permeable Catalyst Reactors

| Run No. | 12 | 13 | 14 | 15 | 16 |
|---|---|---|---|---|---|
| Sulfiding Conditions, Internal Surface | 50% H$_2$ + 50% H$_2$S, 4 hours at 400° C, total gas flow = 8 feet$^3$ | | | | |
| Feed Material | Phenylcyclohexane, Phenanthrene Benzothiophene (various proportions) | | | Filtered Reilly Tar Oil | |
| Wt. of Feed Material, g | 150.0 | 160.1 | 205.2 | 267.7 | 114.4 |
| Pump Rate, g/hr | 56.2 | 64.0 | 41.0 | 48.6 | 57.2 |
| Total Run Time, hrs | 1.63 | 1.25 | 1.5 | 1.9 | 2.0 |
| Residence Time in Catalyst Tubing, min | 3.0 | 3.0 | 4.5 | 12.6 | 10.2 |
| LHSV | 20.0 | 20.0 | 13.3 | 4.8 | 5.9 |
| Catalyst Tubing Temperature, °C | | | 400 | | |
| Pressure Inside Tubing, psig | 650 | 1,350 | 1,350 | 767 | 1,380 |
| Pressure Differential (shell to tubing), psig | 4.5 | 10.0 | 10.0 | 8.5 | 10.0 |
| Hydrogen Flow, liters/hr | 6.26 | 5.56 | 4.50 | 5.40 | 5.10 |
| Total H$_2$ Flow, liters | 10.21 | 6.95 | 6.75 | 10.3 | 10.2 |
| Stoichiometric H$_2$ Required, liters[1] | 6.55 | 5.02 | 6.03 | 8.8 | 9.2 |
| Recovery of Feed as Liquid, % | 85.6 | 85.0 | 93.5 | 89.3 | 48.0 |

[1]Based on the amount required for all the known hydrogenation reactions.

tors set forth in Tables VI and VII with those for the cobalt-molybdenum reactors in Table VIII, it will be seen that the reactions of the pure compounds were similar but that the sulfided cobalt-molybdenum tubes appeared to have a slightly greater activity than the sulfided nickel-molybdenum tubes at the same approximate temperatures and pressures for the production of dihydrophenanthrene and its hydrocracking products dimethylbiphenyl, methylbiphenyl, and biphenyl, and the production of tetrahydrophenanthrene and its cracking product, naphthalene, The total yield of volatiles (pentane through trimethylbenzenes) was essentially the same for the nickel-molybdenum and cobalt-molybdenum sulfided tubes and was dependent upon temperature and hydrogen pressure. In runs 13 and 19 there was excessive loss of volatile components due to inadequacies of the test system. However, the volatiles for the remaining runs with porous tubing are probably well represented in Tables VI, VII, and VIII. It appears that the yield of volatiles was approximately doubled with a 50° C. increase in temperature and again approximately doubled with the doubling of the pressure. The yield of volatiles appears to be independent of feed resident time over the LHSV range of 10.2 to 20.0 indicating a possible approach to equilibrium even at 3 minutes residence time at these conditions.

One feature that distinguishes the sulfided Ni/Mo and Co/Mo from sulfided Ni catalysts is the production of significant quantities of various hydroaromatic intermediates, and the production of large quantities of benzene and alkylbenzenes. Table IX compares the product compositions of run 10 using a thin-walled nickel tube and run 12 using a nickel-molybdenum tube. As shown the yield of benzene and alkylbenzenes was very much greater for the Ni/Mo sulfided tube. As shown by x-ray diffraction both tubes contained nickel subsulfide, however $MoS_2$, a known hydrogenation catalyst, was present in the Ni/Mo tube as well as the $Ni_3S_2$. In addition, the presence of $MoNi_4$ was also determined.

In all of the experimental runs as long as hydrogen flow was maintained through the tubing wall there was never any indication of carbon deposits, even after many hours of use. At the termination of run 16 at 400° C. the pressure differential of 10 psig hydrogen from the shell side of the tubing side was lost, allowing tar oil feed to penetrate the pores under conditions of poor hydrogen contact. A heavy carbonaceous deposit was produced, indicating that extensive cracking had occurred. Accordingly, it is essential that a hydrogen pressure differential be maintained across the hydrogen permeable tube at all times during operation.

TABLE VIII

| | Reaction of Pure Compounds with Hydrogen Diffusing Through Porous Cobalt-Molybdenum Tubing with Sulfided Inner Wall | | |
|---|---|---|---|
| Run No. | 17 | 18 | 19 |
| Temp., ° C | 350 | 400 | 400 |
| Pressure inside tube, psig | 750 | 728 | 1,495 |
| Pressure, differential, psig | 20 | 9.0 | 7.0 |
| Wt. Feed Material, g | 90.0 | 113.6 | 65.75 |
| Pump Rate, g/hr. | 45 | 50.49 | 26.3 |
| Total Run Time, hrs. | 2.00 | 2.25 | 2.50 |
| Residence Time, min. | 11.4 | 10.2 | 19.2 |
| LHSV | 5.3 | 5.9 | 3.1 |
| Hydrogen Flow, l/hr. | 4.7 | 7.2 | 5.64 |
| Total $H_2$ Flow, liters | 9.4 | 16.3 | 14.1 |
| | Composition, Weight % | | | | | |

| | Feed | Product | Feed | Product | Feed | Product |
|---|---|---|---|---|---|---|
| Pentane | 0.00 | 0.00 | 0.00 | 2.73 | 0.00 | 0.00 |
| Benzene | 0.64 | 6.91 | 0.60 | 7.54 | 1.75 | 0.03 |
| Toluene | 0.00 | 0.02 | 0.00 | 4.73 | 0.00 | 0.08 |
| Xylenes | 0.00 | 1.93 | 0.00 | 6.36 | 0.00 | 1.74 |
| Trimethylbenzenes | 0.00 | 0.00 | 0.00 | 1.13 | 0.00 | 0.59 |
| Naphthalene | 0.00 | 0.62 | 0.00 | 4.68 | 0.00 | 2.20 |
| Biphenyl | 0.00 | 0.00 | 0.00 | 3.46 | 0.00 | 4.49 |
| Methylbiphenyl | 0.00 | 0.00 | 0.00 | 0.00 | 0.00 | 0.99 |
| Dimethylbiphenyl | 0.00 | 0.00 | 0.00 | 0.00 | 0.00 | 1.12 |
| Dihydrophenanthrene | 0.00 | 0.00 | 0.00 | 0.05 | 0.00 | 5.97 |
| Tetrahydrophenanthrene | 0.00 | 0.00 | 0.00 | 0.00 | 0.00 | 2.08 |
| Phenanthrene | 11.82 | 5.05[1] | 12.12 | 5.70[1] | 13.28 | 23.74[1] |
| Benzothiophene | 4.42 | 4.42[1] | 4.51 | 5.40[1] | 5.27 | 5.28[1] |

[1]High, due to loss of volatiles, primarily pentane and benzene.

TABLE IX

| | Comparison of Thin-Wall Nickel Tubing and Porous Nickel-Molybdenum Tubing Reactors with Sulfided Inner Walls at 400° C | | | | | |
|---|---|---|---|---|---|---|
| | Solvent = Phenylcyclohexane Composition, Weight % | | | | | |
| Run No. | 10 | | | 12 | | |
| Reactor | Thin-Wall Ni | | | Porous Ni-Mo | | |
| Tube-Side Pressure, psig | 1,000 | | | 650 | | |
| LHSV | 1.2 | | | 20.0 | | |
| | Feed | Receiver Product | Wt. % Reacted | Feed | Receiver Product | Wt. % Reacted |
| Benzene | 0.00 | 0.08 | | 0.00 | 16.56 | |
| Toluene | 0.00 | 0.09 | | 0.00 | 0.63 | |
| Xylenes | 0.00 | 0.19 | | 0.00 | 1.77 | |
| Trimethylbenzenes | 0.00 | 0.00 | | 0.00 | 0.06 | |
| Biphenyl | 0.00 | 0.67 | | 0.00 | 0.58 | |
| Phenanthrene | 12.97 | 7.70 | 41 | 10.17 | 5.60 | 45 |

TABLE IX-continued

| Benzothiophene | 7.06 | 4.79 | 32 | 4.52 | 3.29 | 27 |

Table X depicts the dependence of the yield upon the resistance time, and operating pressure and temperature inside the tube, for the two compounds phenanthrene and benzothiophene as coal model compounds. It is seen from runs 1 and 10, that conversion increases with increased residence time. Runs 12 and 13 (Tablve VI), and runs 15 and 16 (Table VII) demonstrate that conversion increases with the increased hydrogen pressure while runs 7 and 10 (Table X) demonstrated that conversion increases with increased temperature.

TABLE X
Relationship Between LHSV, Pressure, or Temperature and Amount of Compound Reacted

| | | | | Weight % Reacted | |
|---|---|---|---|---|---|
| Run No. | LHSV | Press., psig | Temp., °C | Phenanthrene | Benzothiophene |
| 1 | 0.35 | 1,000 | 400 | 48 | 90 |
| 11 | 0.51 | 1,000 | 450 | 50 | 56 |
| 13-S[1,2] | 20.0 | 1,350 | 400 | 62 | 37 |
| 12[1] | 20.0 | 650 | 400 | 45 | 27 |
| 10 | 1.2 | 1,000 | 400 | 41 | 32 |
| 7 | 1.1 | 1,000 | 290 | 16 | 18 |

[1] Ni-Mo porous; others, thin-wall Ni tubing.
[2] Sample drained from reactor at conclusion of run to avoid loss of volatiles.

DESCRIPTION OF THE PREFERRED EMBODIMENT

A reactor unit suitable for practicing the present invention would comprise a shell approximately 3 feet in diameter by 77 feet in length. Each reactor unit contains approximately 1000 tubes in a conventional heat exchanger tube bundle configuration. The tubes would either be normal density for low-hydrogen uptake reactions, or porous for high-hydrogen uptake reactions. The tubes would be 0.5 inch ID transition metal (Ni, Co, Mo, Fe, W, etc., or mixtures thereof) tubing with a wall thickness of about 0.01 to 0.10 inch, which is sufficient to withstand a compression of 5 to 700 psig corresponding to the differential pressure from the shell side to the tube side. The operating temperature is 400° to 450° C. and the pressure is in the range of 1000 to 2000 psig. An example for low-hydrogen uptake follows. The permeability K for nickel tubing to hydrogen at 450° C. is about $3.16 \times 10^{-6}$ cm$^2$/atmosphere sec. The diffusion rate of hydrogen under these conditions is $6.27 \times 10^{-7}$ g/cm$^2$/sec for a wall thickness of 0.00875 inch and a differential pressure of 700 psig, which for each 0.5 inch ID tubing is 0.108 ft$^3$/ft/hr. The mild hydrotreating operation will require approximately 200 SCF hydrogen per barrel of feed, which is equivalent to 0.172 gallons ft$^2$/hr or 0.0227 gallons per foot of tubing per hour which could be hydrotreated, or about 77 feet of tubing for each barrel treated each day. Residence time for liquid feed in the plant would be about 0.451 hours. The inner surface of the tubing is initially coated with subsulfide formed at 500° C. by the reaction of nickel with hydrogen sulfide gas. During operation organic sulfur compounds present in the feed will maintain the catalyst surface. Depending upon the formation conditions, there could be as much as 500 m$^2$ catalyst per ft$^2$ of tubing. Because each 0.5 inch ID has 10.1 sq. ft. of inner surface before sulfiding, the total estimated weight of catalyst for a 10,000 barrel per day plant would be about 1.11 tons with an estimated thickness of sulfide coating of about 0.0185 mm or 8.33% of the original nickel wall thickness. During operation hydrogen diffuses through the nickel tubing wall from the shell side or high pressure side either as atomic hydrogen or as nickel hydride, both very active forms compared with molecular hydrogen. This diffusion continues unchanged through the nickel subsulfide coating with the hydrogen being consumed essentially completely at the interface between the catalyst and the liquid feed. Coking precursors are continuously removed from the catalyst surface by reaction with the hydrogen diffusing through the catalyst. The nickel subsulfide is retained in steady state condition and not converted by hydrogen to metallic nickel as long as the feed contains about 0.2 weight percent sulfur or more. Porous tubing permits operation with differential pressures as low as about 5 psig, and hydrogen flows at higher differential pressure sufficient for high-hydrogen uptake (8,000 SCF per barrel of feed).

According to the above experimental runs it has been demonstrated that a catalytic sulfide surface can be maintained upon the inner surface of the hydrogen permeable tubes under conditions of hydrogen diffusion through the tubes. This can be considered to be a highly beneficial, unexpected result. In view of the observations of U.S. Pat. No. 3,210,162 to David W. Rudd in which a permeable catalyst was described, it was demonstrated that an oxide coating produced on one side of a hydrogen permeable disc was completely removed by diffusing hydrogen through the disc from the nonoxidized side. In the present invention the sulfide catalyst coating is stable to the physical and chemical action of diffusing hydrogen and the appearance of the sulfide surface indicates an expanded network of metal sulfide crystallites for providing a very high catalytic surface area which promotes the essentially stoichiometric consumption of hydrogen that was observed. Since the driving force of the hydrogenation reaction is the hydrogen continuously diffusing through the permeable metal, excess hydrogen is not required to provide favorable kinetics since no carbon deposits were detectable so long as hydrogen is diffusing through the tubing wall. Based upon demonstrations herein it is seen that practically any catalytic process with gaseous, liquid, or slurry feed would be benefited by diffusing a reactive gas through a permeable catalyst to cause the reactive gas or reactive species thereof to react at the inner surface. In addition, hydrogen diffusing through the metal substrate would tend to prevent adhesion of particulate matter within the feed.

What is claimed is:
1. A method for hydrotreating a carbonaceous liquid comprising the steps of:
   a. In a reaction zone at a temperature in the range of 300° to 450° C. and at a pressure in the range of 300 to 4000 psig effecting contact of the carbonaceous liquid with a catalytic transition metal sulfide layer disposed on a surface of a hydrogen permeable substrate comprising said transition metal with said transition metal being selected from the group consisting of Fe, Ni, Co, Mo, W, V, Cr, Mn, Cu, Zn, Cd, and combinations thereof.
   b. Introducing hydrogen into said reaction zone by creating a sufficient hydrogen pressure differential through the permeable substrate from the substrate opposite the surface bearing the sulfide layer to cause diffusion of hydrogen or reactive hydrogen containing species through said metal substrate to effect hydrogenation of said carbonaceous liquid.

2. The method of claim 1 wherein said substrate has a porosity in the range of an effective amount near zero to about 20 percent and a mean pore size in the range of 0.05 to an effective pore size near zero microns.

3. The method of claim 1 wherein a differential pressure of about 1 to about 1700 psig is maintained across said substrate.

4. The method of claim 1, wherein said carbonaceous liquid contains at least 0.2 weight percent sulfur in sulfur containing compounds, and wherein at least a portion of said sulfide surface is formed by the reaction of said sulfur compound with transition metal of said substrate.

5. The method of claim 1, wherein said hydrogen diffusion rate is maintained sufficiently low to permit substantially all hydrogen diffusing through said metal substrate to react with said carbonaceous liquid.

6. The method of claim 1, wherein said carbonaceous liquid is a coal derived liquid containing undissolved mineral matter.

7. The method of claim 1, wherein said carbonaceous liquid is a coal derived liquid containing undissolved coal particles.

8. The method of claim 1 in which said carbonaceous liquid is passed through a metal tube having said catalytic sulfide layer on its inner surface and said hydrogen is diffused from the outside surface of said metal tube.

9. A hydrotreating reactor comprising a plurality of hydrogen permeable tubes comprising a transition metal selected from the group of Fe, Co, Mo, Ni, W, V, Cr, Mn, Cu, Zn, Cd, and combinations thereof, said tubes having a catalytic layer of sulfide of said transition metal on the inner surface of said tubes, means for conducting a carbonaceous liquid feed through the interior of said tubes for contact with the catalytic layer, means for conducting hydrogen gas to the outside of said tubes under sufficient pressure to cause hydrogen to diffuse through the tube walls, and means for withdrawing hydrogenated product from within said tubes.

* * * * *